(12) United States Patent
Chen

(10) Patent No.: US 6,696,988 B2
(45) Date of Patent: Feb. 24, 2004

(54) METHOD AND APPARATUS FOR IMPLEMENTING CIRCULAR PRIORITY ENCODER

(75) Inventor: Feng Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 545 days.

(21) Appl. No.: 09/749,898

(22) Filed: Dec. 29, 2000

(65) Prior Publication Data

US 2002/0087770 A1 Jul. 4, 2002

(51) Int. Cl.[7] ................................................. H03M 7/00
(52) U.S. Cl. ......................................................... 341/50
(58) Field of Search ..................................... 341/50, 51

(56) References Cited

U.S. PATENT DOCUMENTS

| | | | |
|---|---|---|---|
| 5,160,923 A | * 11/1992 | Sugawara | 341/50 |
| 5,568,485 A | 10/1996 | Chaisemartin | |
| 6,385,631 B1 | 5/2002 | Chen et al. | 708/211 |

OTHER PUBLICATIONS

Jinn–Shyan Wang et al., "High–speed and Low–Power CMOS Priority Encoders", *IEEE Journal of Solid–State Circuits*, vol. 35, No. 10, Oct. 2000, pp. 1511–1514.

Jinn–Shyan Wang et al., "A High–Speed Single–Phase-–Clocked CMOS Priority Encoder", *ISCAS 2000, IEEE International Symposium on Circuits and Systems*, May 28–31, 2000, Geneva Switzerland, pp. V–537–540.

Rozo Hashemian, "A High Speed Compact Priority Encoder", pp. 197–200, no date.

Masato Yoneda et al., "A 1 Mbit NAND–Type Content Addressable ROM with a Variable Length Match Function", *1992 Symposium on VLSI Circuits Digest of Technical Papers*, pp. 86–87.

* cited by examiner

*Primary Examiner*—Brian Young
(74) *Attorney, Agent, or Firm*—LeMoine Patent Services, PLLC

(57) ABSTRACT

A priority encoder is provided to receive a plurality of signals at corresponding input terminals and to determine a highest priority signal having a predetermined state. The signals are prioritized based on their corresponding terminals. The priority encoder may examine the signals by starting with a highest priority signal and proceeding to examine other signals at other terminals by proceeding in a decreasing order toward a lower priority signal.

27 Claims, 20 Drawing Sheets

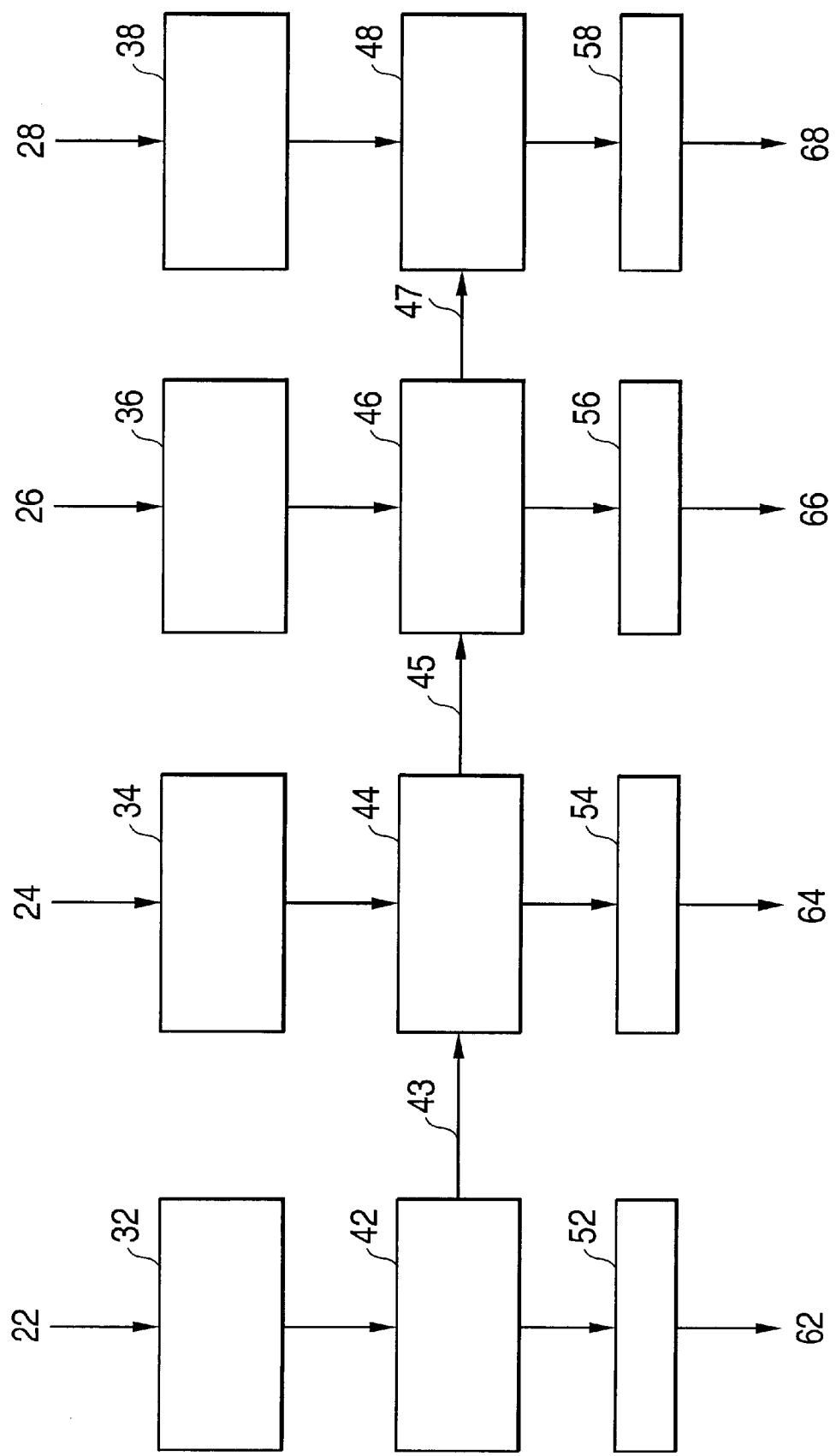

FIG. 8
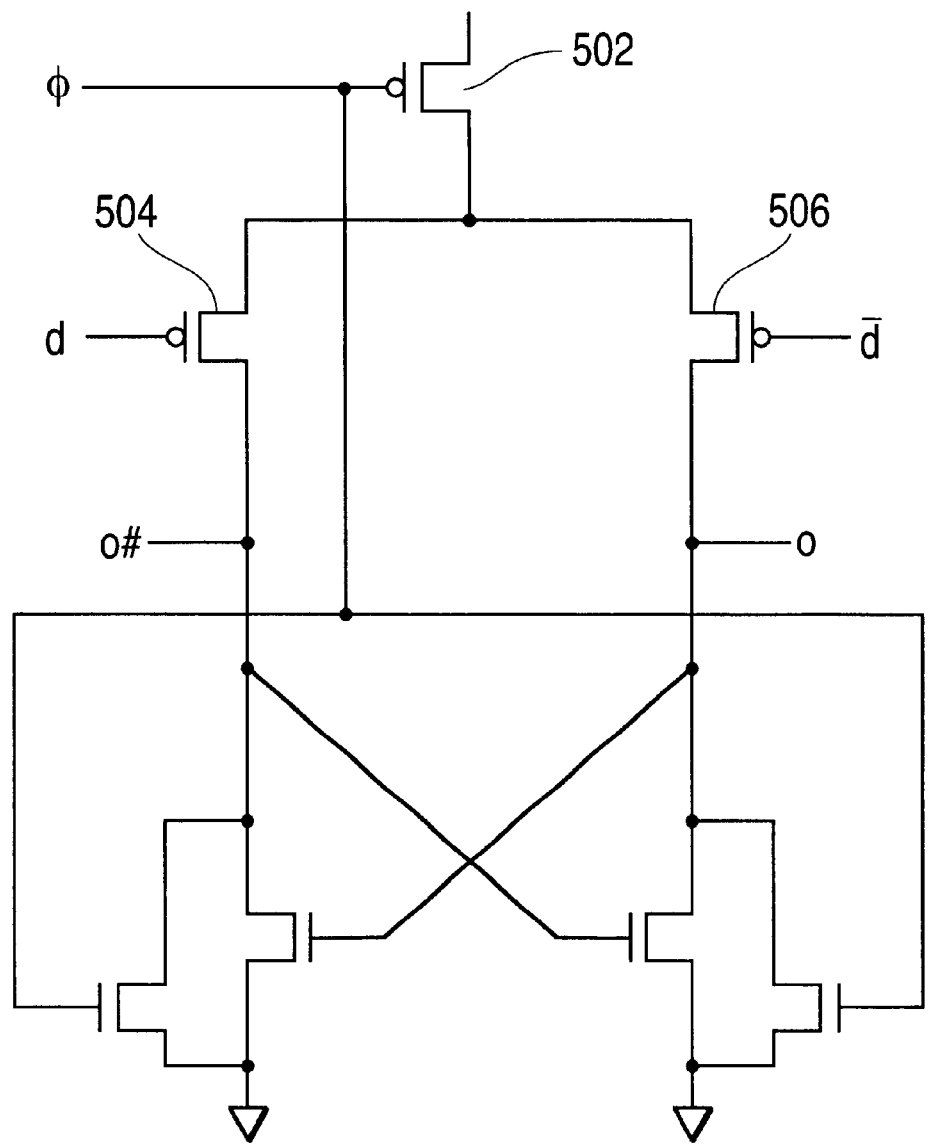
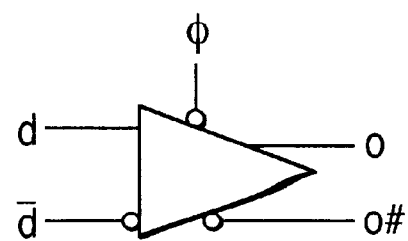

100

METHOD AND APPARATUS FOR IMPLEMENTING CIRCULAR PRIORITY ENCODER

FIELD

The present invention is related to priority encoders. More particularly, the present invention is related to the use of circular priority encoders.

BACKGROUND

Priority encoders are circuits that serve to acknowledge a request having a highest priority (or rank) from among a plurality of requests arriving as active signals to the priority encoder. A request acknowledgment may include enabling a circuit (such as a microprocessor) so that the circuit may execute the task corresponding to the request.

A priority encoder may receive one or a plurality of simultaneous requests on respective request lines (i.e., input lines) assigned with respective ranks, for example from 1 to n. The priority encoder may acknowledge one request at a time through acknowledgment lines. In some encoders, the acknowledgment lines directly correspond to request lines, and the encoder transmits the acknowledged request only on the acknowledgment lines. In some priority encoders, the acknowledgment lines may provide a binary rank of the acknowledged request.

In linear priority encoders, the priorities (or ranks) assigned to the request lines may be distinct. That is, the priorities may be assigned by decreasing order to the ranks of the request lines by starting with a highest rank. Linear encoders may acknowledge the request of the highest rank.

Linear encoders may be implemented as a non-sequential logic circuit, of a carry propagation type, that acknowledges the request of the highest rank after any change in the states of the request lines. The actual delay may depend on the carry propagation time of the circuitry.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto.

The following represents brief descriptions of the drawings in which like reference numerals represent like elements and wherein:

FIG. 4 is a block diagram of a priority encoder provided in a passgate chain;

FIG. 8 is an example of a sense amplifier along with its circuit symbol;

DETAILED DESCRIPTION

Figure 1:
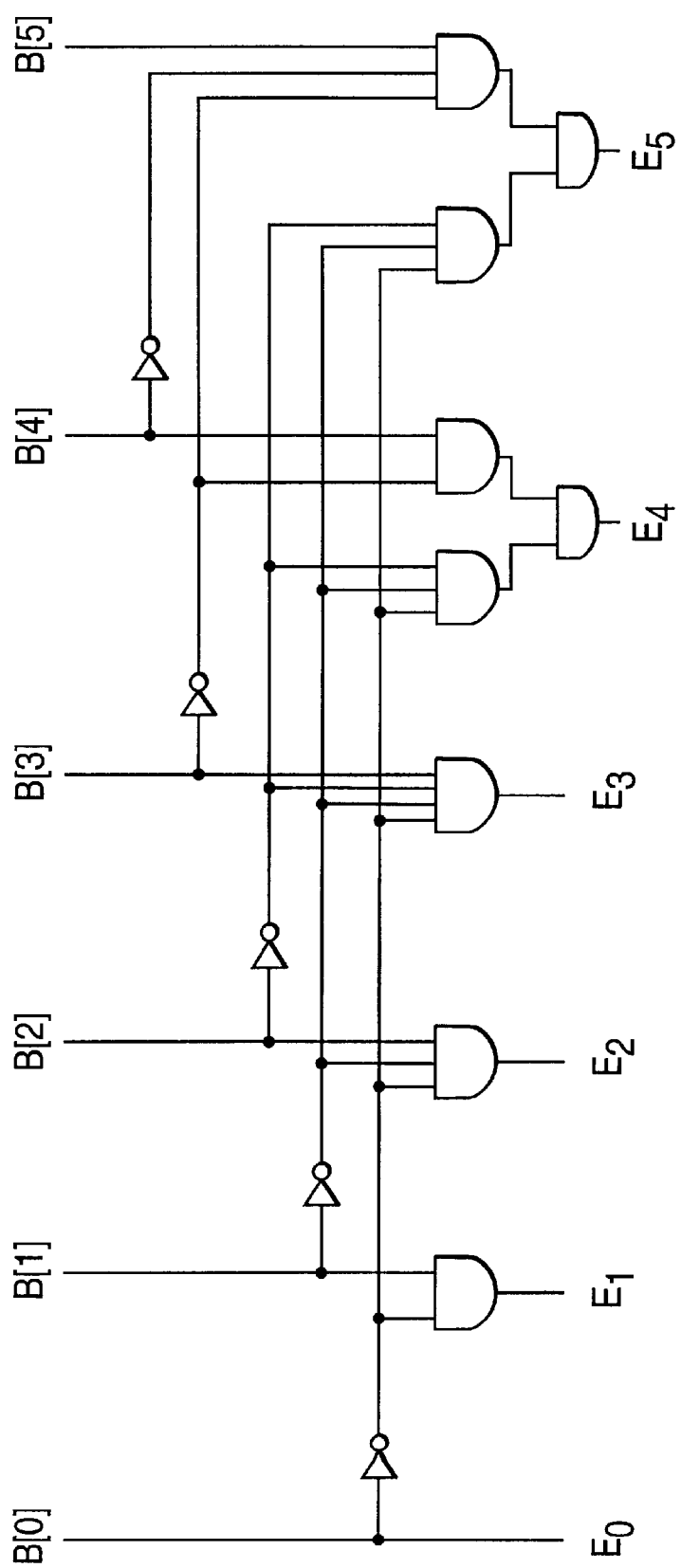
FIG. 1 is an example of a priority encoder at a logic gate level.

Before beginning a detailed description of the present invention, mention of the following is in order. When appropriate, like reference numerals and characters may be used to designate identical, corresponding or similar components in differing figure drawings. Further, in the detailed description to follow, example sizes and values may be given although the present invention is not limited to the disclosed sizes and values. Still further, clock and timing signal FIGS. may not be drawn to scale. With regard to description of any timing signals, the terms assertion and negation may be used in an intended generic sense. More particularly, such terms are used to avoid confusion when working with a mixture of "active-low" and "active-high" signals, and to represent the fact that the present invention is not limited to the illustrated/described signals, but may be implemented with a total/partial reversal of any of the "active-low" and "active-high" signals by a change in logic. Additionally, well known power/ground connections to integrated circuits (ICs) and other components may not be shown within the FIGS. for simplicity of illustration and discussion, and so as not to obscure the invention. Further, arrangements may be shown in block diagram form in order to avoid obscuring the invention, and also because specifics with respect to implementation of such block diagram arrangements may be dependent upon the platform within which the present invention is to be implemented. That is, the specifics are within the purview of one skilled in the art. Where specific details (e.g., circuits) are set forth in order to describe example embodiments of the invention, it should be apparent to one skilled in the art that the invention can be practiced without these specific details. Embodiments may also be described and labeled with respect to signal(s) and signal line(s). These terms are intended to be interchangeable. Finally, it should be apparent that any combination of hard-wired circuitry and software instructions may be used to implement embodiments of the present invention. That is, the present invention is not limited to any specific combination of hardware circuitry and software instructions.

Priority encoders may provide output voltages indicative of a position of a leading one (or zero) in a binary tuple and may be used in many different types of circuits for many different applications. For high speed, low power circuits, there is a need to provide for priority encoders with low power-delay products.

FIG. 1 illustrates an example embodiment of a priority encoder at a logic gate level using AND gates. This priority encoder provides the position of the leading one in a six-bit binary tuple B=(B[0], B[1], B[2], B[3], B[4], B[5]), wherein B[i]=1 denotes a HIGH voltage (or HIGH state) and B[i]=0 denotes a LOW voltage (or LOW state). The output voltages are labeled $E_p$ i=0, 1, . . . 5, where only at most one $E_i$ is HIGH to indicate the position of the leading one in the six-bit binary input B.

For high speed circuits, logic gates with a large fan-in are generally to be avoided because signal propagation delay in the circuit may be too large. In the FIG. 1 embodiment, the fan-in is limited to four. For a six-bit priority encoder, this fan-in limitation is not necessarily a problem as only two levels of AND gates are utilized in FIG. 1. However, extending the circuit structure of FIG. 1 to an n-bit priority encoder and maintaining the fan-in limitation at four may require $\lfloor n/4 \rfloor +1$ levels of AND gates, where $\lfloor x \rfloor$ for some x denotes the largest integer less than or equal to x. For example, for a 32-bit priority encoder, there may be nine levels of AND gates in a circuit structure similar to that of FIG. 1. Too many logic gate levels may lead to unacceptable signal propagation delays in high speed circuits.

Power dissipation is another problem for high speed circuits. Dynamic power dissipation for a gate may be approximated as $p_i C_L V_S V_{DD} f_{clk}$, where the variables are switching probability, load capacitance, voltage swing of a signal, supply voltage, and clock frequency, respectively. For the circuit of FIG. 1, the voltage swing may also be the supply voltage so that $V_s = V_{DD}$. For the case of $V_s = V_{DD}$, and for a given clock frequency, load capacitance, and switching probability, the dynamic power dissipation may be reduced by reducing the supply voltage. However, signal propagation delay may be approximately inversely proportional to supply voltage so that reducing the supply voltage may lead to an unacceptable signal propagation delay.

Figure 2:
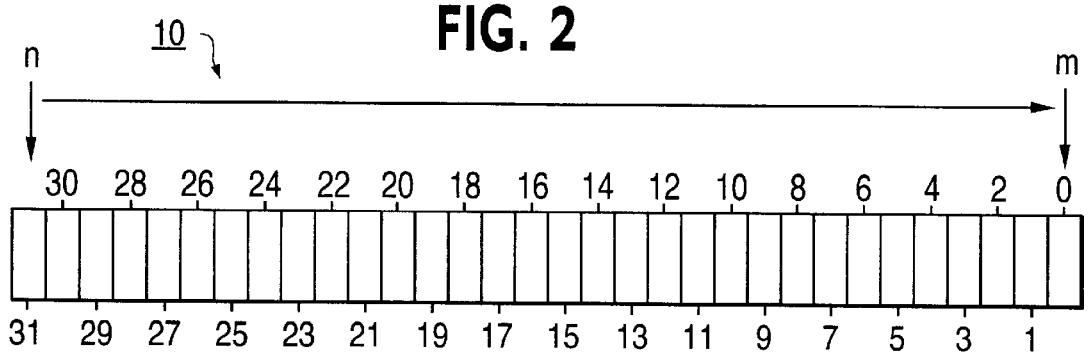
FIG. 2 is an example diagram of a linear priority encoder.

FIG. 2 shows an example diagram of a priority encoder 10 having 32 terminals (or registers) labeled 0–31. The priority encoder 10 may determine a highest priority input signal having a predetermined state, such as a HIGH state. In the following discussion, the predetermined state will be a HIGH state although the predetermined state may just as easily be the LOW state. This determination of the highest priority input signal having a high state may occur during an examination period. For this example priority encoder, terminal 31 (labeled n) has the highest priority and the terminal 0 (labeled m) has the lowest priority. During the examination of the input signals, the analysis may begin with the input terminal identified by n and proceed in the direction of the arrow toward the terminal identified by m to find the highest priority input signal having the HIGH state. Once the priority encoder 10 has determined that an input signal has a HIGH state, then it may be unnecessary for the priority encoder 10 to analyze any other input signals (i.e., downstream signals) since the highest priority signal having the HIGH state has already been determined. Information regarding the highest priority input signal may be communicated to other components. The priority encoder 10 may utilize the input signals in a linear manner from the first terminal 31 and proceed towards the last register 0.

Figure 3:
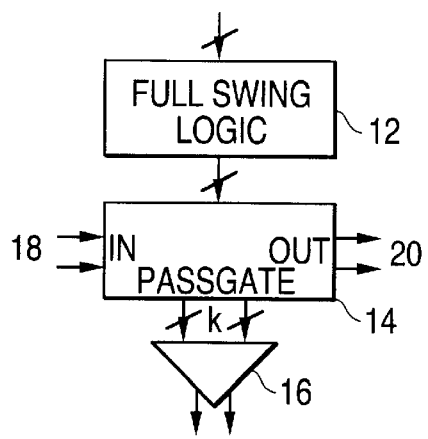
FIG. 3 is a block diagram of a full swing logic block, passgate structure and sense amplifier of a priority encoder.
Figure 5A:
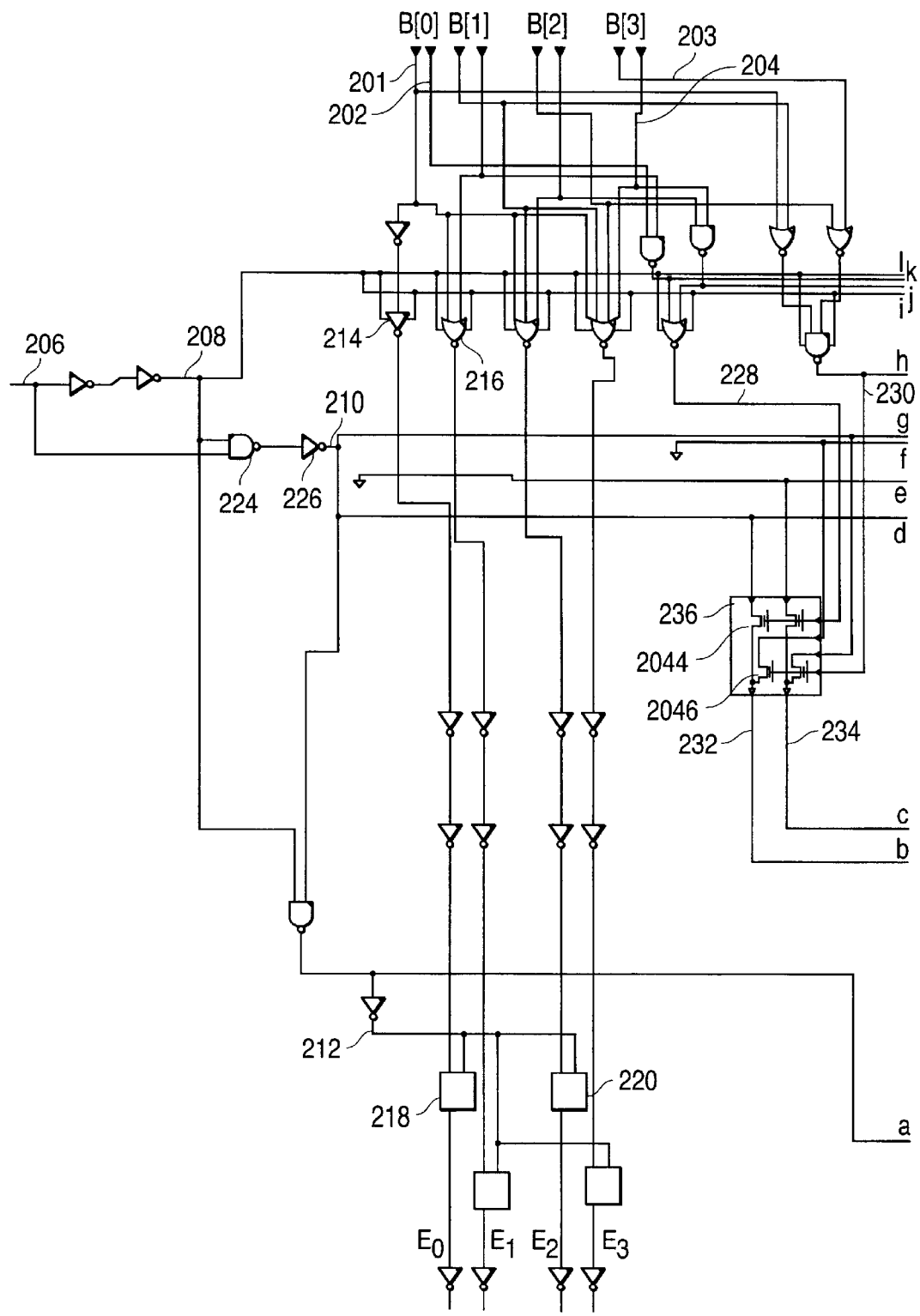
FIGS. 5a–h are a circuit schematic of a priority encoder.
Figure 5B:
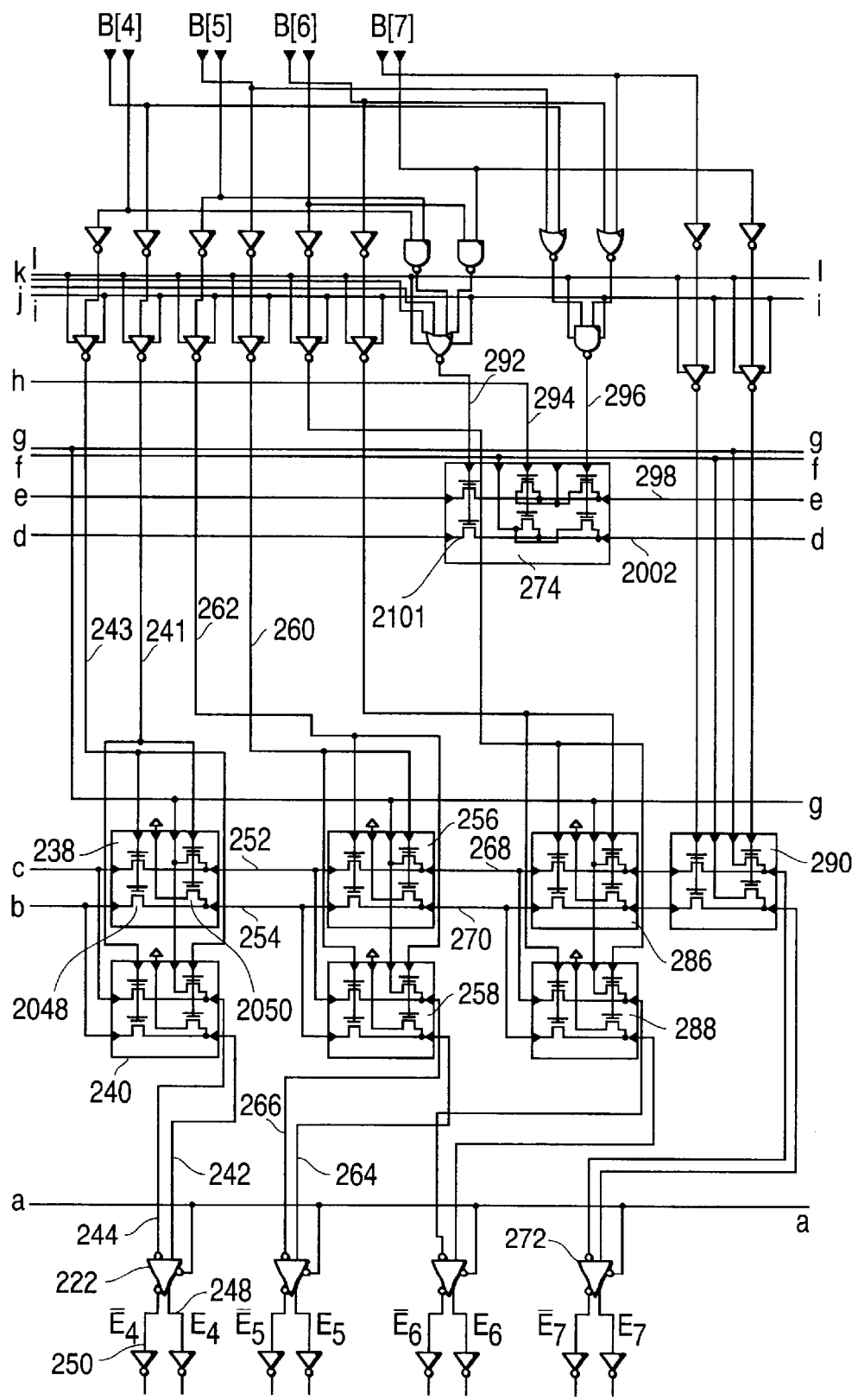
Figure 5C:
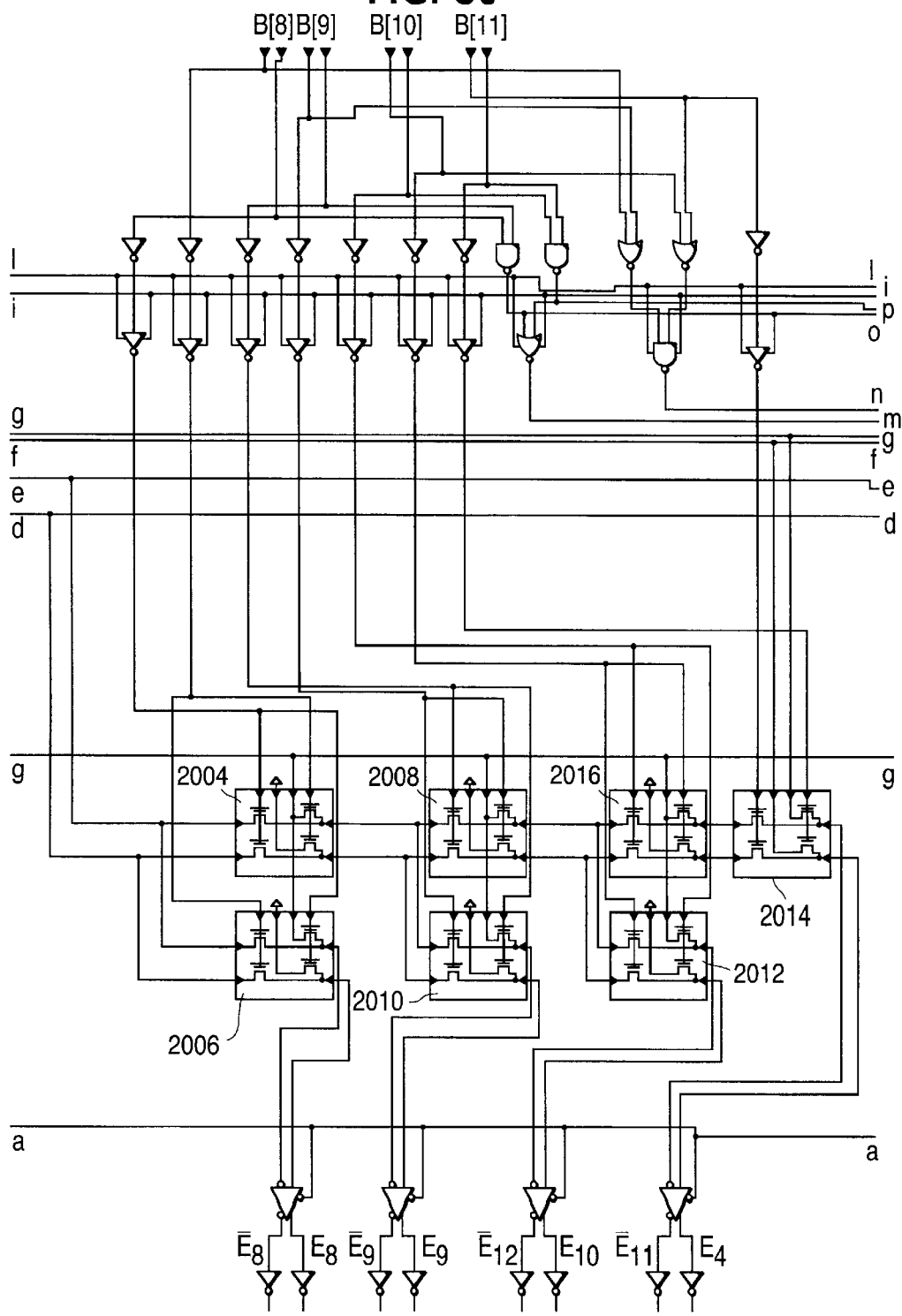
Figure 5D:
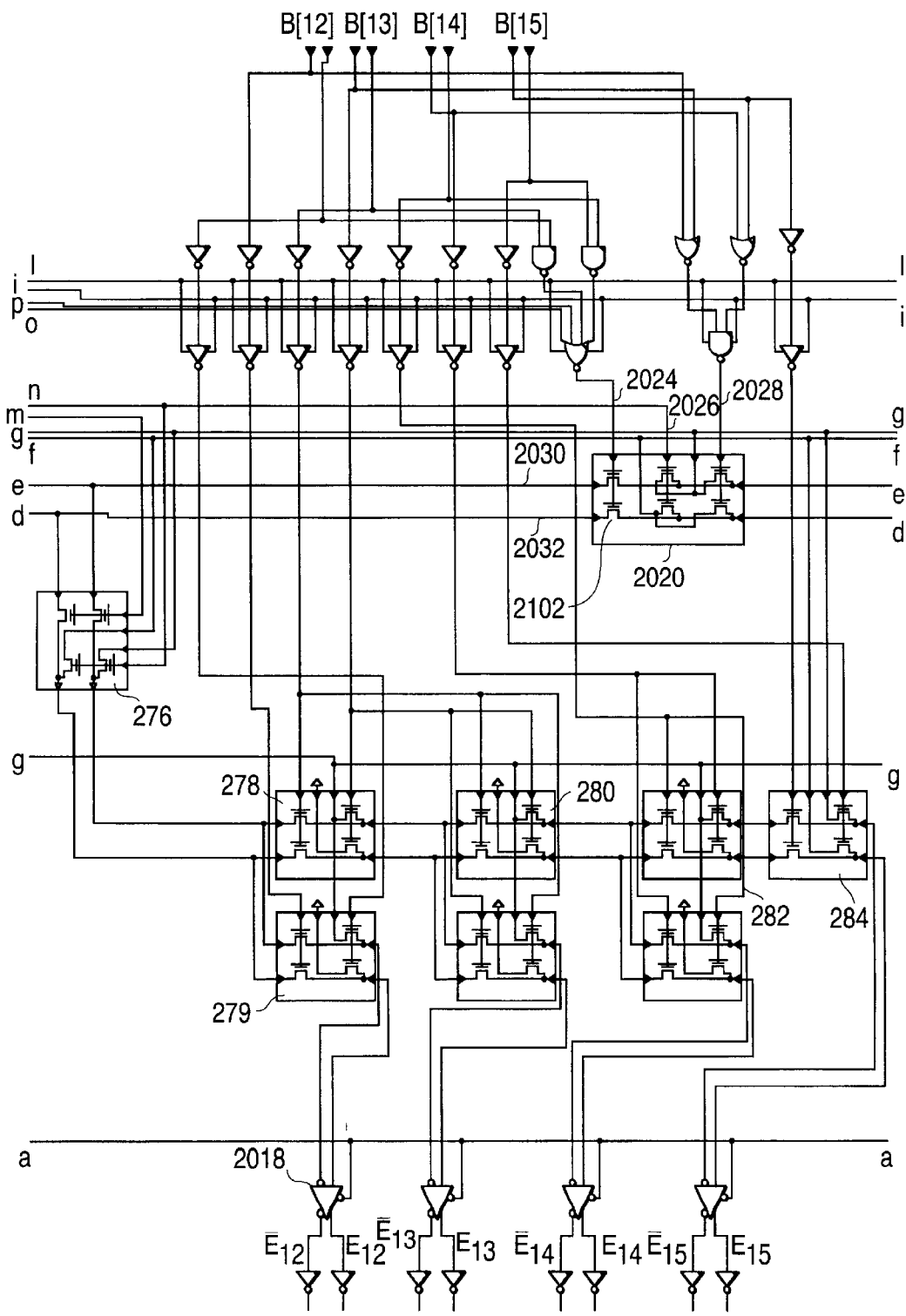
Figure 5E:
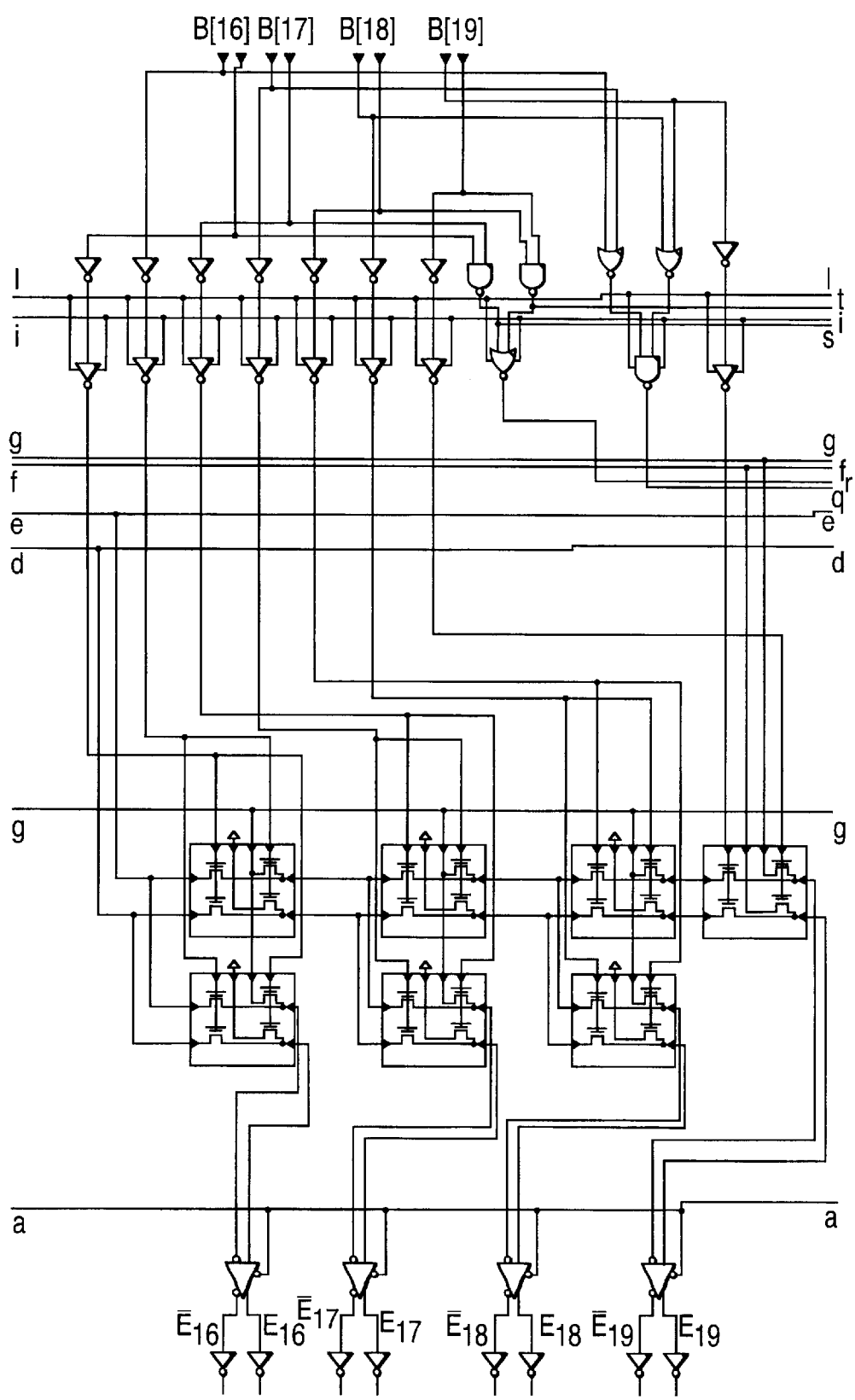
Figure 5F:
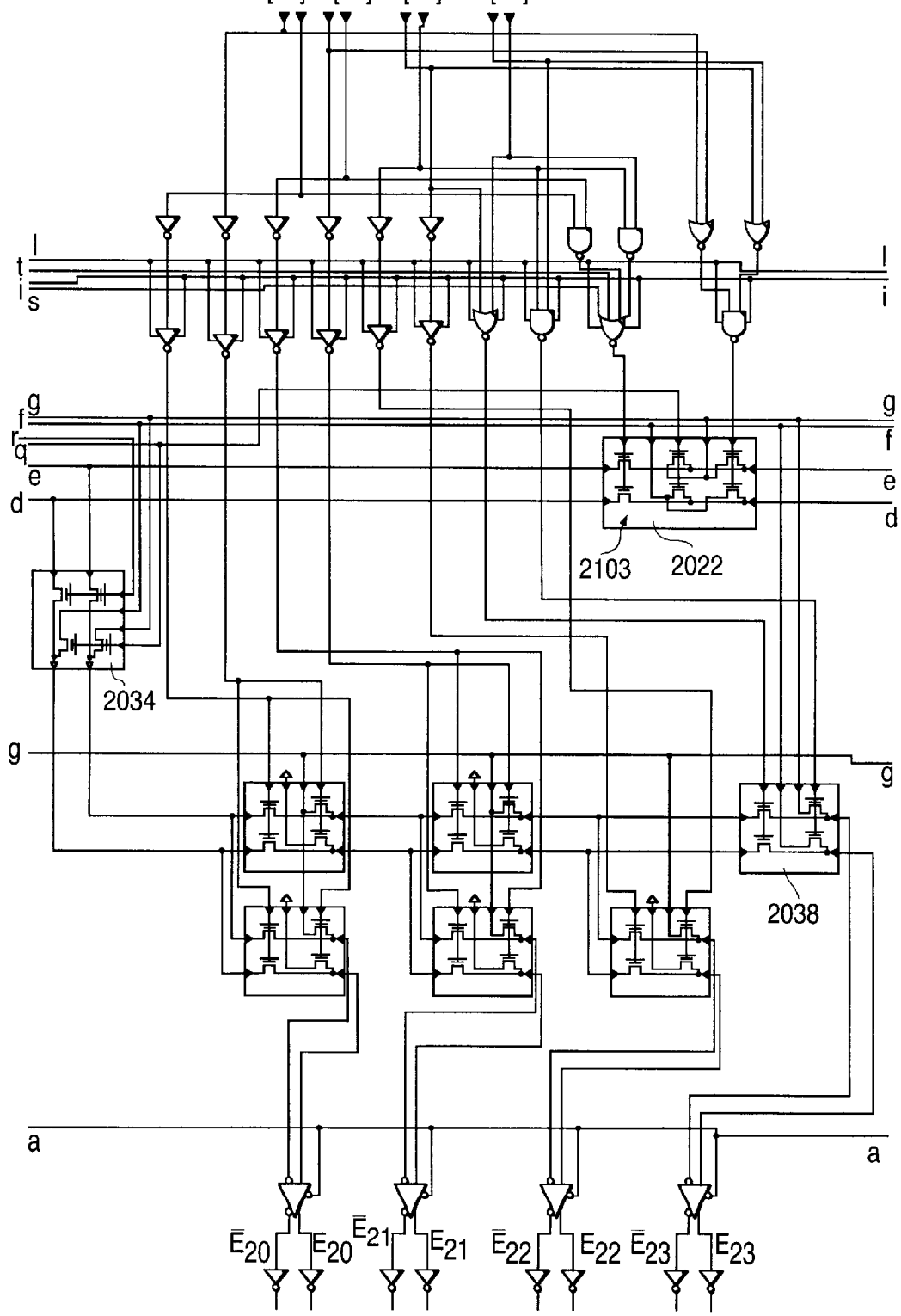
Figure 5G:
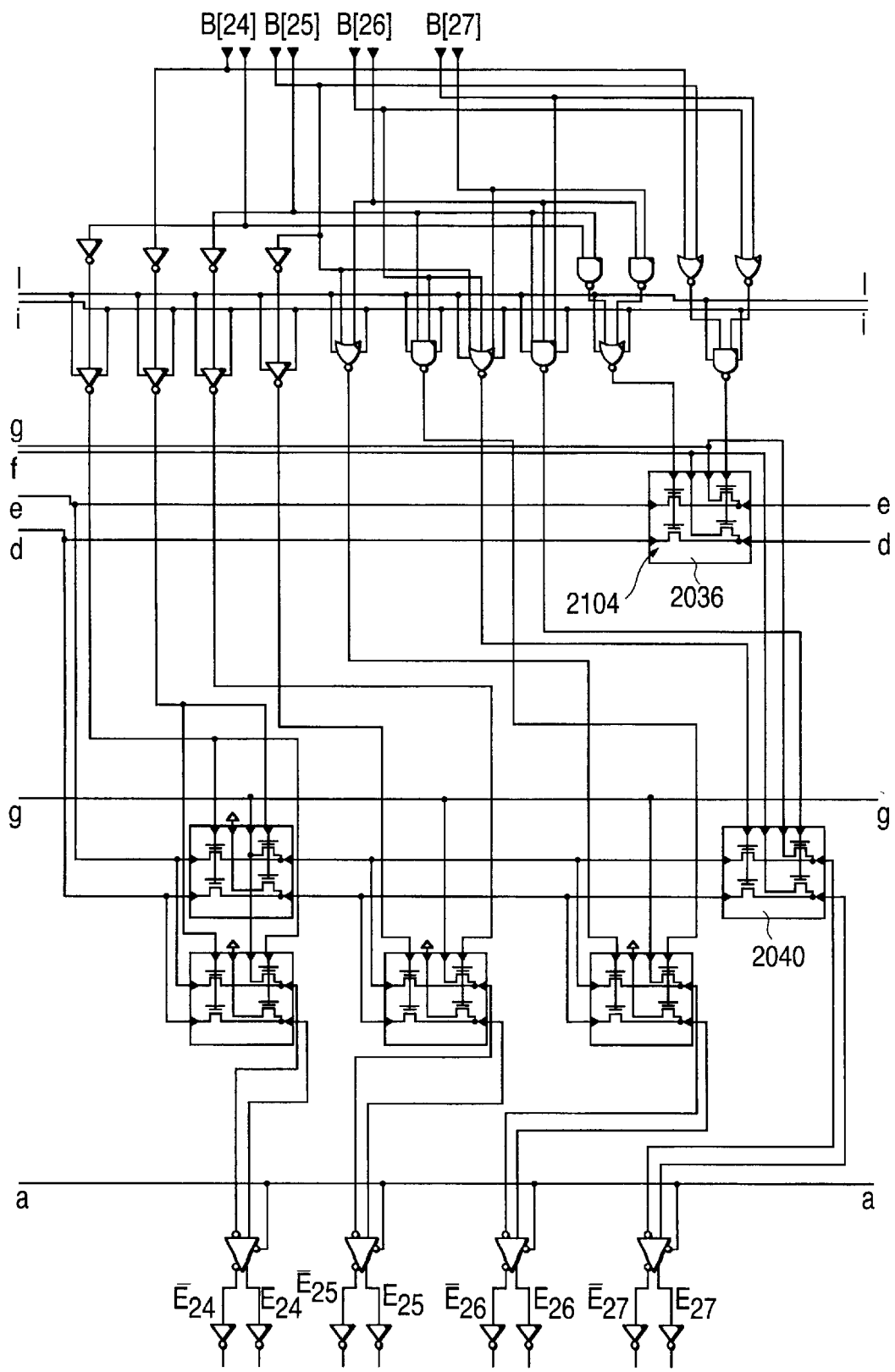
Figure 5H:
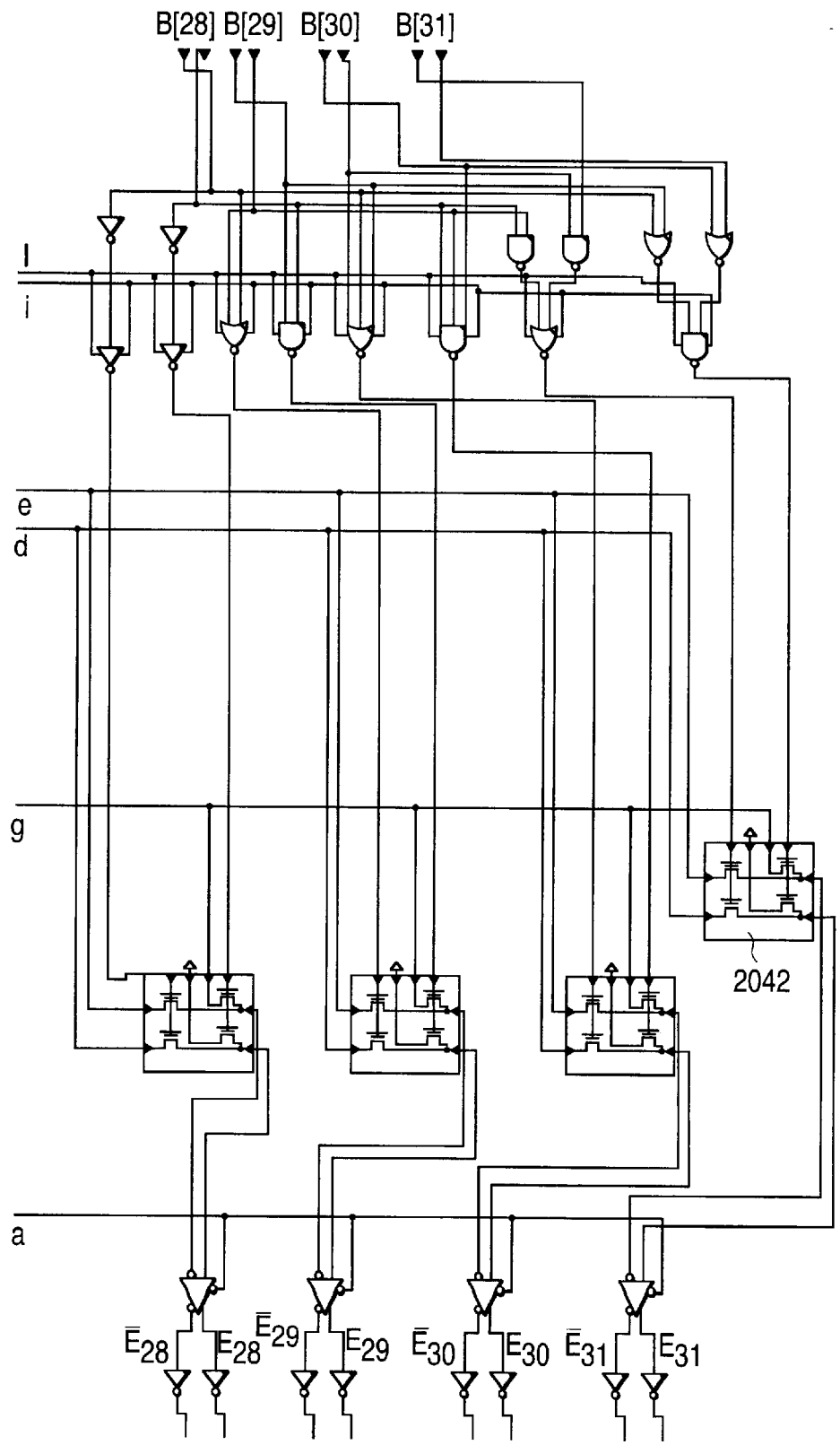

FIG. 3 is a block diagram of a full swing logic block, passgate structure and sense amplifier that may be utilized in embodiments of the present invention. Other configurations and embodiments are also within the scope of the present invention. As shown in FIG. 3, a full swing logic block 12 may receive a plurality of signals (such as differential signals) as inputs to the full swing logic block 12. The plurality of signals correspond to n-bits. The full swing logic block 12 may operate in a similar manner to the structure shown in FIG. 1 to determine whether any of the n-bits have a HIGH state. If more than 6 bits are used, then the structure of FIG. 1 may be easily expanded using AND logic circuits and inverter circuits, for example. The full swing logic block 12 may be coupled to the passgate structure 14 to receive n outputs from the full swing logic block 12 regarding whether any of the input n-bits are the HIGH state. The passgate structure 14 may be further coupled to a sense amplifier 16 (or a plurality of sense amplifiers) to provide an output (or outputs) indicative of whether any of the input signals to the full swing logic block 12 have the HIGH state. As will be described below in greater detail, the passgate structure 14 may receive input signals 18 from another passgate structure (i.e., an upstream passgate structure) and provide output signals 20 to another passgate structure (i.e., downstream passgate structure). The input signals 18 and the output signals 20 may be used to communicate to other components of the priority encoder regarding whether any input signal has the HIGH state. The sense amplifier 16 (or similar type of structure) may recover a small differential signal between signals input to the sense amplifier 16 due to its high sensitivity to differential voltages.

FIG. 4 is a block diagram of a priority encoder provided in a passgate chain. The passgate chain shows how groups of the FIG. 3 structure may be coupled together to form a multi-bit priority encoder. The grouping of the bits may be used to achieve high speed and to make this technique scalable. More specifically, FIG. 4 shows four full swing logic blocks (such as full swing logic block 32, 34, 36 and 38) each of which may correspond to the full swing logic block 12 shown in FIG. 3. Each full swing logic block may include AND logic circuits and inverter circuits in a similar manner as FIG. 1. The full swing logic blocks 32, 34, 36 and 38 may be coupled by a plurality of signal lines to passgate structures 42, 44, 46 and 48, respectively. Each of the passgate structures 42, 44, 46 and 48 may correspond to the passgate structure 14 shown in FIG. 3. The passgate structures 42, 44, 46 and 48 may then be coupled to sense amplifiers 52, 54, 56 and 58, respectively. While FIG. 4 shows four blocks of sense amplifiers, it is understood that each of those blocks may include one or a plurality of sense amplifiers or similar type of circuits.

Each of the full swing logic blocks 32, 34, 46 and 38 may receive a set of bits from an input vector. For example, the full swing logic block 32 may receive 8 bits as signal vector 22, the full swing logic block 34 may receive 8 bits as signal vector 24, the full swing logic block 36 may receive 8 bits as signal vector 26 and the full swing logic block 38 may receive 8 bits as signal vector 28. Thus, the signal vectors 22, 24, 26 and 28 may correspond to a 32 bit wide input signal vector. In this example, each of the full swing logic blocks 32, 34, 36 and 38 may separately analyze the input signals to determine whether any of its input bits are in the HIGH state and relay that information to the corresponding passgate structures as shown in FIG. 4.

The four passgate structures 42, 44, 46 and 48 may be coupled together to communicate information regarding a HIGH input signal. For example, the passgate structure 42 may be coupled to the passgate structure 44 by a signal line 43, the passgate structure 46 may be coupled to the passgate structure 44 by a signal line 45 and the passgate structure 48 may be coupled to the passgate structure 46 by a signal line 47. In a similar manner as described above with respect to FIG. 3, the passgate structures 42, 44, 46 and 48 may communicate information to each other along the signal lines 43, 45 and 47. Stated differently, the passgate structures may be coupled in a chain to communicate information regarding whether any one of the full swing logic blocks 32, 34 and 36 has received a signal having the HIGH state. Upstream passgate structures may communicate with downstream passgate structures regarding whether any upstream input signal (i.e., higher priority signals) are of the HIGH state. If so, then the passgate structures may notify downstream passgate structures when a signal having the HIGH state has been determined. When the highest priority input signal is determined to be HIGH, it may be unnecessary for any input downstream signals to be analyzed. The use of passgate structure in this type of chain may allow information to be communicated more rapidly and thus result in less signal propagation delay.

The sense amplifiers 52, 54, 56 and 58 recover the small differential signal and provide outputs along the signal lines 62, 64, 66 and 68, respectively. The outputs 62, 64, 66 and 68 may indicate a location of the highest priority input signal having the HIGH state.

FIGS. 5a–5h (denoted collectively as FIG. 5) illustrate an embodiment of a 32-bit priority encoder. The full priority encoder circuit may be obtained from these individual figures by sequentially connecting FIGS. 5a–5h left-to-right with interconnects on the right hand side of a figure coupled to like-labeled interconnects on the left hand side of the next sequential figure. This priority encoder is described in U.S. Pat. No. 6,385,631, issued May 7, 2002, entitled "Priority Encoder". Above the input terminals to the priority encoder of FIG. 5 are written the components of B. The voltages on the input terminals are indicative of the components of B and $\overline{B}$. For example, the voltage on input terminal 201 is LOW if B[0]=0 and is HIGH if B[0]=1. As another example, the voltage on input terminal 203 is LOW if B[0]=0 and is HIGH if B[0]=1. Similar statements apply to all the other input terminals, however, for simplicity the other input terminals are not explicitly labeled except for their association with the components of B.

The output terminals of the priority encoder of FIG. 5 are labeled by $E_i$ (or its complement) over the range of index i. Additional buffers or drivers (not shown) may be coupled to these output terminals.

A node (or terminal) 206 may be driven based on a clock voltage signal. The clock voltage signal at a node 208 may be a delayed version of the clock voltage signal at the node 206. The pulse voltage signal at a node 210 may be similar to the clock voltage signal at the node 208 except that its rising edge is delayed. The clock signal voltage at a node 212 is a delayed version of the pulse voltage signal at the node 210. The clock voltage signal of the node 208 may be used to drive domino logic gates, and these domino logic gates are represented in FIG. 5 by gate symbols having explicit lines connected to the node 208. For example, an inverter 214 and a NOR gate 216 are domino logic gates clocked by the clock voltage signal of the node 208.

The pulse voltage signal at the node 210 may be used to provide signals to various pass cells within FIG. 5. In FIG. 5, the pass cells are the sub-circuits that are enclosed within a rectangle and may include either four nMOSFETs (n-Metal Oxide Semiconductor Field Effect Transistors) or six nMOSFETs. These pass cells will be described in more detail later. The clock voltage signal at the node 212 may be used to drive latch circuits such as latch circuits 218 and 220, and sense amplifiers 222.

Conventional complementary metal-oxide semiconductor (CMOS) logic may be used for the first four outputs $E_p$, i=0, 1, 2, 3 in FIG. 5. The remaining outputs, however, may utilize pass cells and sense amplifiers. Two types of pass cells are shown in FIG. 5, which for the purpose of describing the FIG. 5 embodiment may be classified as either four-transistor pass cells or six-transistor pass cells. One may consider the input terminals to the pass cells as those terminals labeled vp, vp#, a, or a#. These terminal may be referred to as pass terminals, and the signals at these terminals may be referred to as pass signals. The output terminals are those terminals labeled o or o#. The terminals connected to gates of the transistors may be referred to as control terminals, and the signals on these terminals may be referred to as control signals. The input-output relationships for these two types of pass cells are similar to each other as will be discussed below.

For the FIG. 5 embodiment, the control signals for each pass cell may be provided by the domino logic gates. For other embodiments, the control signals may be provided by other types of circuits. In FIG. 5, for each pass cell, the vp# terminal is grounded and the vp terminal is connected to the node 210 so as to be responsive to the pulse signal at the node 210. The voltages at vp# and vp therefore include a differential voltage, where the Boolean function $f$ may be taken as the constant 1. The voltages at the two input terminals a and a# are also a differential voltage.

Figure 6:
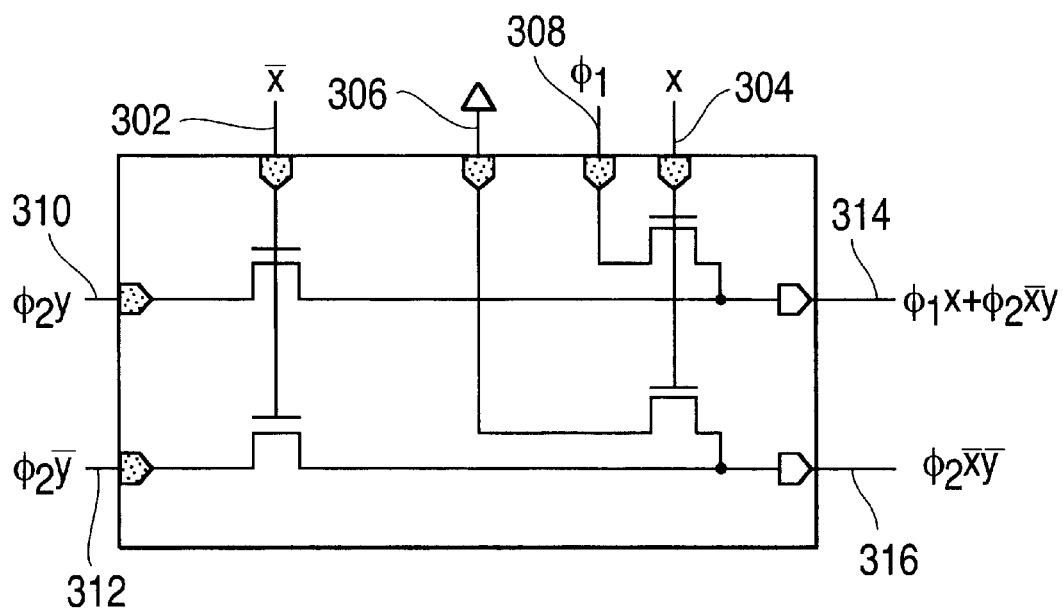
FIG. 6 is an example of a four-transistor pass cell.

Input-output relationships of the pass cells will now be described. FIG. 6 shows a four-transistor pass cell where terminals 302 and 304 are the control terminals, terminals 306, 308, 310 and 312 are the pass terminals, and terminals 314 and 316 are the output terminals. The four-transistor pass cells in FIG. 5 may be coupled to the domino logic gates so that voltages at the control terminals 302 and 304 during an evaluation phase are complementary to each other. Also, the four-transistor pass cells in FIG. 5 are such that voltages at the pass terminals 306 and 308 are complementary to each other, and voltages at the pass terminals 310 and 312 are complementary to each other.

Two pulse voltage signals $\phi_1$ and $\phi_2$ may be available to the four-transistor pass cell in FIG. 6. Making the assumption that no signal loss is incurred due to signal propagation through the nMOSFETs of FIG. 6, the output voltages at the terminals 314 and 316 are shown in FIG. 6 in terms of the two pulse voltage signals and the voltages (or Boolean variables) x and y. The summation of Boolean variables denotes Boolean OR. The output voltages of FIG. 6 include the differential voltage $\{(x+y)\}$.

In FIG. 6, we assume that the pulse voltage signals at the pass terminals are the same as the pulse voltage signals at the output terminals 314 and 316. However, the actual pulse voltage signals may depend upon the loading on the output terminals and the transfer characteristics of the various nMOSFETs and interconnects in the path traveled by the pulse voltage signal.

Figure 7:
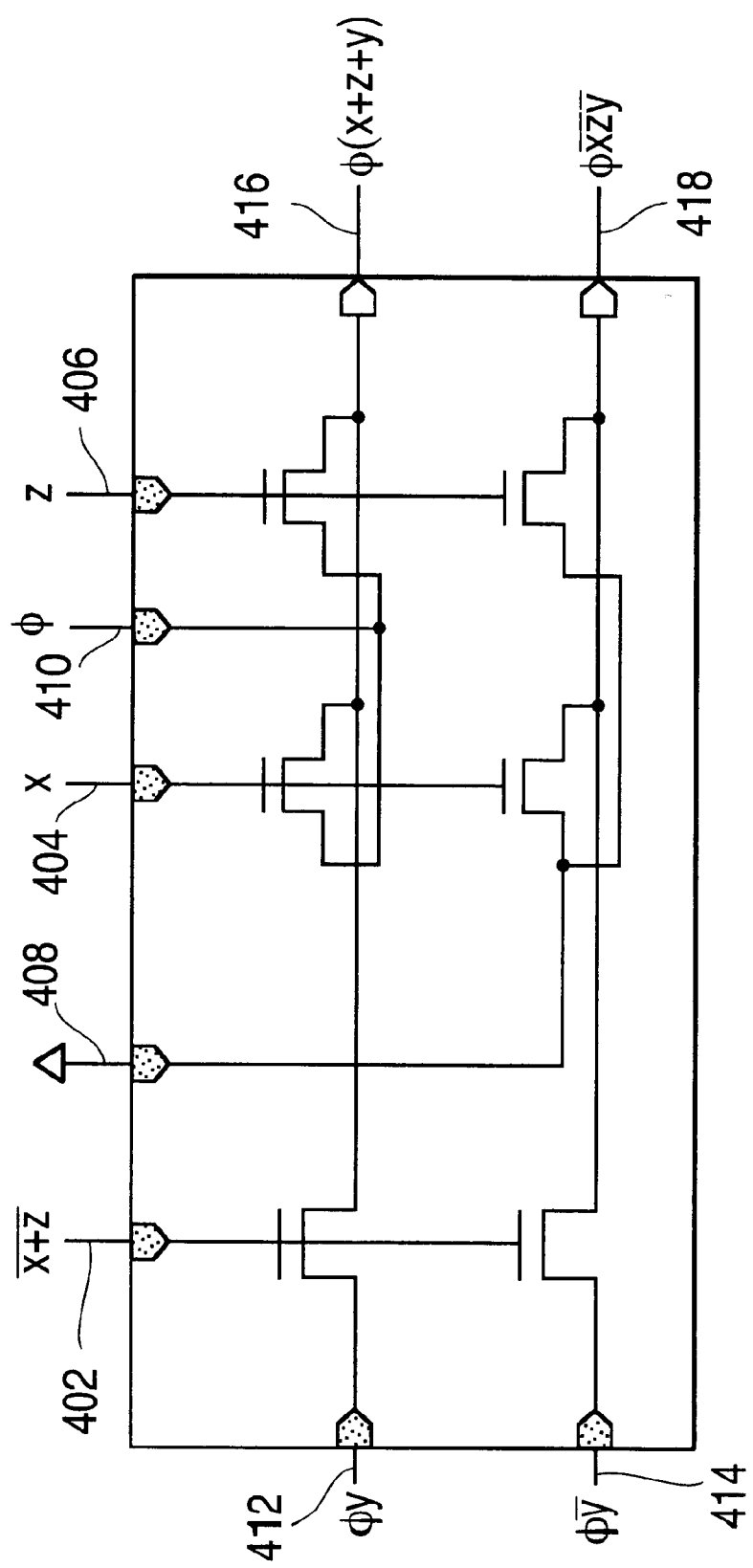
FIG. 7 is an example of a six-transistor pass cell.

FIG. 7 shows a six-transistor pass cell. In FIG. 5, the six-transistor pass cells are coupled so that the pass and control voltages satisfy the relationships as shown in FIG. 7, where subscripts for the pulse voltage signal $\phi$ is suppressed for notational simplicity. The control voltage at control terminal 402 is complementary to the Boolean OR of the control voltages at control terminals 404 and 406. The output voltages at output terminals 416 and 418 are indicated in FIG. 7, and include the differential voltage signal $\{(x+z+y)\}$.

FIG. 8 shows a circuit embodiment for a sense amplifier along with its circuit symbol as used in FIG. 5. A clock voltage signal may be applied to a gate of pMOSFET 502 (p-Metal Oxide Semiconductor Field Effect Transistor) and an input differential voltage may be applied to gates of pMOSFETs 504 and 506. The output voltage is taken at drains of pMOSFETs 506 and 504. The output voltage difference $|o-\overline{o}|$ is substantially the supply voltage $V_{DD}$, whereas the input voltage difference $|d-\overline{d}|$ may be much less than $V_{DD}$. FIG. 8 shows only one embodiment for a sense amplifier. Other embodiments of sense amplifiers are well known to those of ordinary skill in the art.

Figure 9:
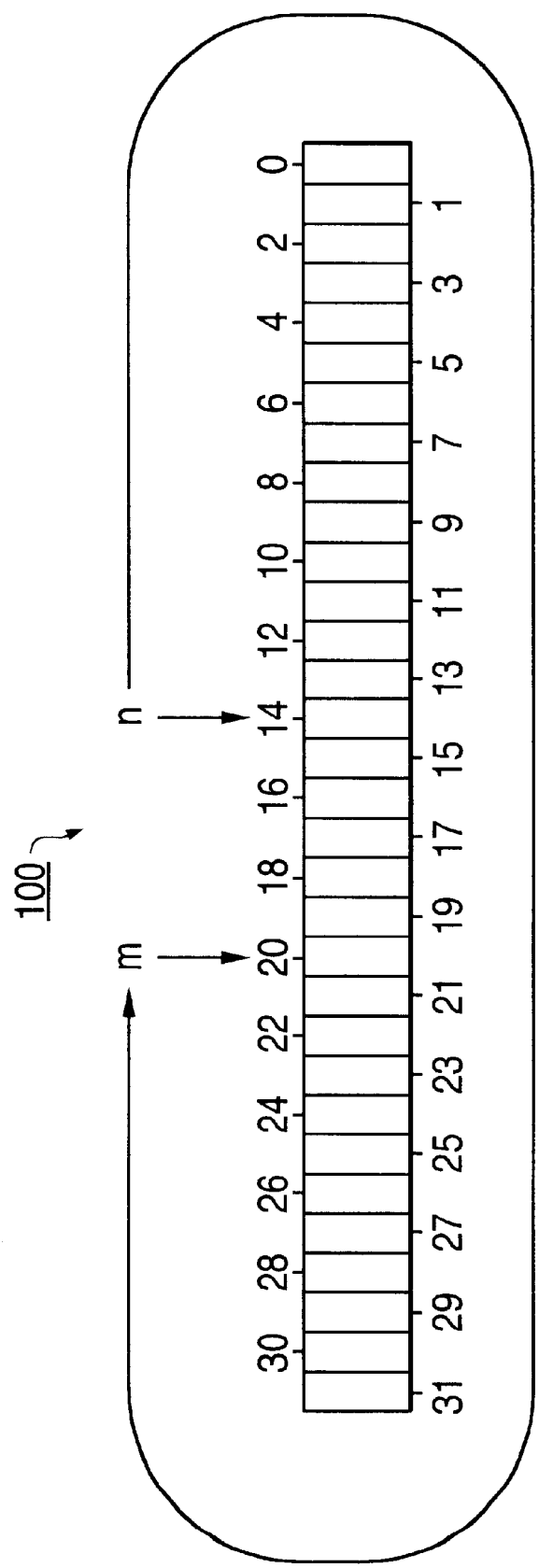
FIG. 9 is a block diagram showing a circular priority encoder according to an example embodiment of the present invention.

FIG. 9 shows an example of a circular priority encoder 100 according to an example embodiment of the present invention. Other configurations and embodiments are also within the scope of the present invention. In this example, the circular priority encoder 100 includes 32 terminals labeled 0–31 in a similar manner as the priority encoder shown in FIG. 2. A circular priority encoder may allow a user to set a highest priority signal location at any terminal. This differs from priority encoders that only allow a highest priority to be at the first terminal such as terminal 31. That is, the circular priority encoder 100 may include appropriate logic to start the examination of the input signals starting with any specific input signal (or terminal). For example, the circular priority encoder 100 may include logic to start the examination at terminal 14 (i.e., the highest priority in this example) and continue examination in a circular manner (i.e., a unidirectional manner) by proceeding from terminal 14 towards terminal 0 in a sequentially decreasing manner and after the signal at terminal 0 then proceeding from terminal 31 towards terminal 15 in a sequentially decreasing manner. The circular priority encoder 100 may also include logic to end the examination of the input signals at any terminal (such as terminal 20). Stated differently, the circular priority encoder 100 includes logic to allow examination of the signals at the terminals beginning with a start terminal n and proceeding in a unidirectional manner (i.e., a circular manner) until reaching a stop terminal m. In order to achieve this more efficiently, the input signals may be grouped together to achieve higher speed and to make this technique scalable. In order to achieve this in a circular passgate chain, passgate structures and full swing logic blocks similar to that shown in FIG. 3 may be used. The circular passgate chain may be built of NMOS passgate structures, PMOS passgate structures or a combination of both PMOS and NMOS passgate structures.

Figure 10:
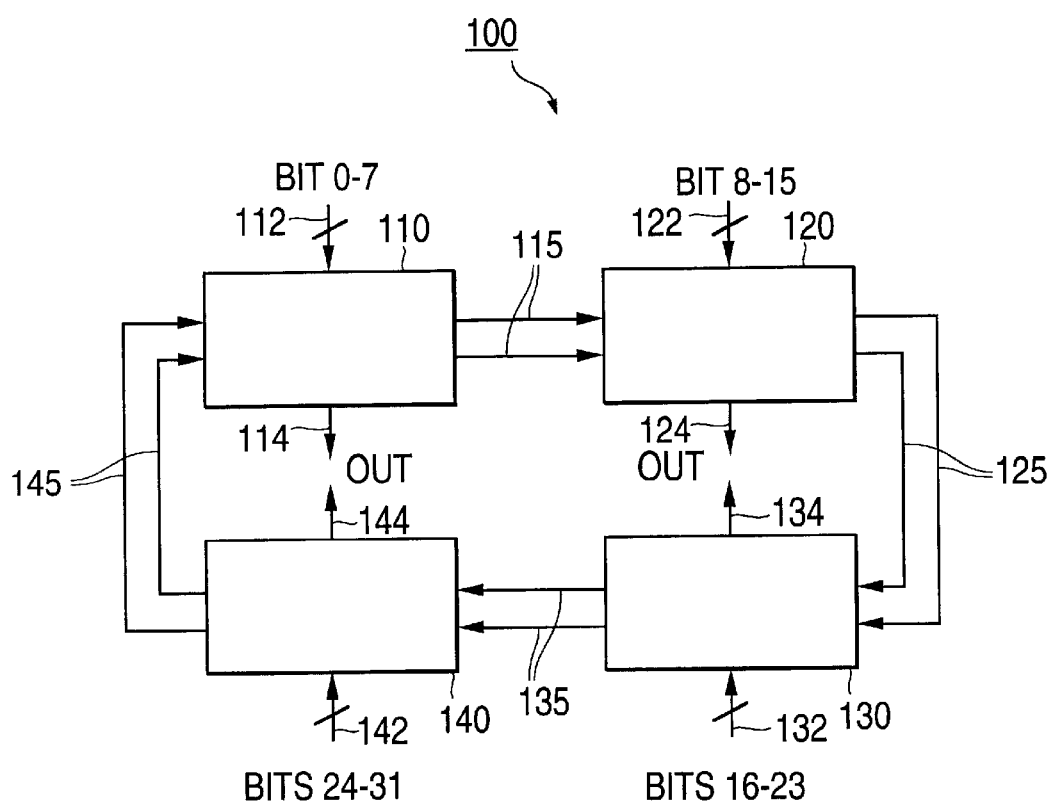
FIG. 10 is a block diagram of a circular priority encoder according to an example embodiment of the present invention.

FIG. 10 is a block diagram of the circular priority encoder 100 according to an example embodiment of the present invention. Other embodiments and configurations of the circular priority encoder are also within the scope of the present invention. The circular priority encoder 100 may include a first logic block 110, a second logic block 120, a third logic block 130 and a fourth logic block 140. In this embodiment, the four logic blocks 110, 120, 130 and 140 will collectively receive a 32 bit wide vector. More specifically, the first logic block 110 receives signals corresponding to bits 0–7 as input signals 112. The second logic block 120 receives signals corresponding to bits 8–15 as input signals 122. The third logic block 130 receives signals corresponding to bits 16–23 as input signals 132, and the fourth logic block 140 receives signals corresponding to bits 24–31 as input signals 142. Each of the logic blocks 110, 120, 130 and 140 is a grouping of 8 bits from the 32 bit wide input vector. As indicated above, each of the bits may be represented by a differential signal. The first logic block 110 may be coupled to the second logic block 120 by signal lines 115, the second logic block 120 may be coupled to the third logic block 130 by signal lines 125 and the third logic block 130 may be coupled to the fourth logic block 140 by signal lines 135. In the FIG. 10 embodiment, the fourth logic block 140 may be coupled back to the first logic block 110 by the signal lines 145. Accordingly, the coupling of the logic blocks 110, 120, 130 and 140 by the signal lines 115, 125, 135 and 145 provides the circular aspect to the priority encoder as generically shown in FIG. 9. Each of the logic blocks 110, 120, 130 and 140 may include logical circuit elements identical (or similar) to the logic circuit elements in the other logic blocks. As such, the number of logic blocks in the circular priority encoder 100 may be easily increased or decreased depending on the width of the input vector. For example, eight logic blocks (each receiving 8 bits) may be used for a 64 bit wide input vector. Still further, each of the logic blocks may receive more or less than 8 bits (or differential signals) depending on the desired speed and signal delay propagation.

The circular priority encoder 100 shown in FIG. 10 examines the 32 bit binary vector to a determine highest priority bit (or differential signal) having the HIGH state. As described above with respect to FIG. 9, it may be desirable to start the priority encoding at any one of the bit locations 0–31. Stated differently, it may be desirable to have any one of the input signals (or bits) have the highest priority. This may be accomplished using the circular passgate chain having the logic blocks 110, 120, 130 and 140 coupled by the signal lines 115, 125, 135 and 145 as shown in FIG. 10. In this example, each logic block 110, 120, 130 and 140 may include an 8 bit full swing logic block similar in operation to the full swing logic block 12 shown in FIG. 3. Each of the logic blocks 110, 120, 130 and 140 may also include a passgate structure similar in operation to the passgate structure 14 shown in FIG. 3. Additionally, each of the logic blocks 110, 120, 130 and 140 may include sense amplifiers similar in operation to the sense amplifier 16 shown in FIG. 3.

Each of the logic blocks 110, 120, 130 and 140 may separately output signals indicating whether any bit (or signal) from its respective 8-bit input signal for that logic block has a HIGH state (assuming that a HIGH state has not yet been determined in an upstream logic block). More specifically, the first logic block 110 receives the input signals 112 (i.e., bits 0–7) and outputs signals 114 indicative of whether any of the input signals 112 have the HIGH state (assuming that a HIGH state has not yet been determined in an upstream logic block). The second logic block 120 receives the input signals 122 (i.e., bits 8–15) and outputs signals 124 indicative of whether any of the input signals 122 have the HIGH state (assuming that a HIGH state has not yet been determined in an upstream logic block). The indication of whether a HIGH state is found may be represented by differential signals 115, 125, 135 and 145. The third logic block 130 receives the input signals 132 (i.e., bits 16–23) and outputs signals 134 indicative of whether any of the input signals 132 have the HIGH state (assuming that a HIGH state has not yet been determined in an upstream logic block), and the fourth logic block 140 receives the input signals 142 (i.e., bits 24–31) and outputs signals 144 indicative of whether any of the input signals 142 have the HIGH state (assuming that a HIGH state has not yet been determined in an upstream logic block). In summary, the circular priority encoder 100 may output 32 bits (or differential signals) as signals 114, 124, 134 and 144. As will be described below, by utilizing a circular passgate structure, at most only one output signal (or bit) will be HIGH as that signal (or bit) will correspond to the highest priority input signal that has the HIGH state. If none of the input signals are HIGH, then none of the output signals will be HIGH.

As shown in FIG. 10, the four 8-bit logic blocks 110, 120, 130 and 140 may be coupled in a circular manner to form the 32-bit circular priority encoder 100. The full swing logic blocks, the passgate structures and sense amplifiers within each of the logic blocks 110, 120, 130 and 140 may be similar to that described above or may include logic to perform the specific logical function that is desired to be implemented. In accordance with embodiments of the present invention, the priority encoding (i.e., the highest priority) may start from any bit location (or terminal) and continue in a single direction (i.e., unidirectional) until a stop bit location (or terminal). This may occur in a manner similar as shown and generically described with respect to FIG. 9. The circular priority encoder 100 built in this manner may be scaled very easy by adding more functional blocks into the circular chain. Due to the groupings of the bits, every additional 8 bits in the input vector may add only one passgate structure into the chain. Multiple levels of groupings may be used to further reduce the number of passgates if the application is scaled up in bit-width.

Figure 11A:
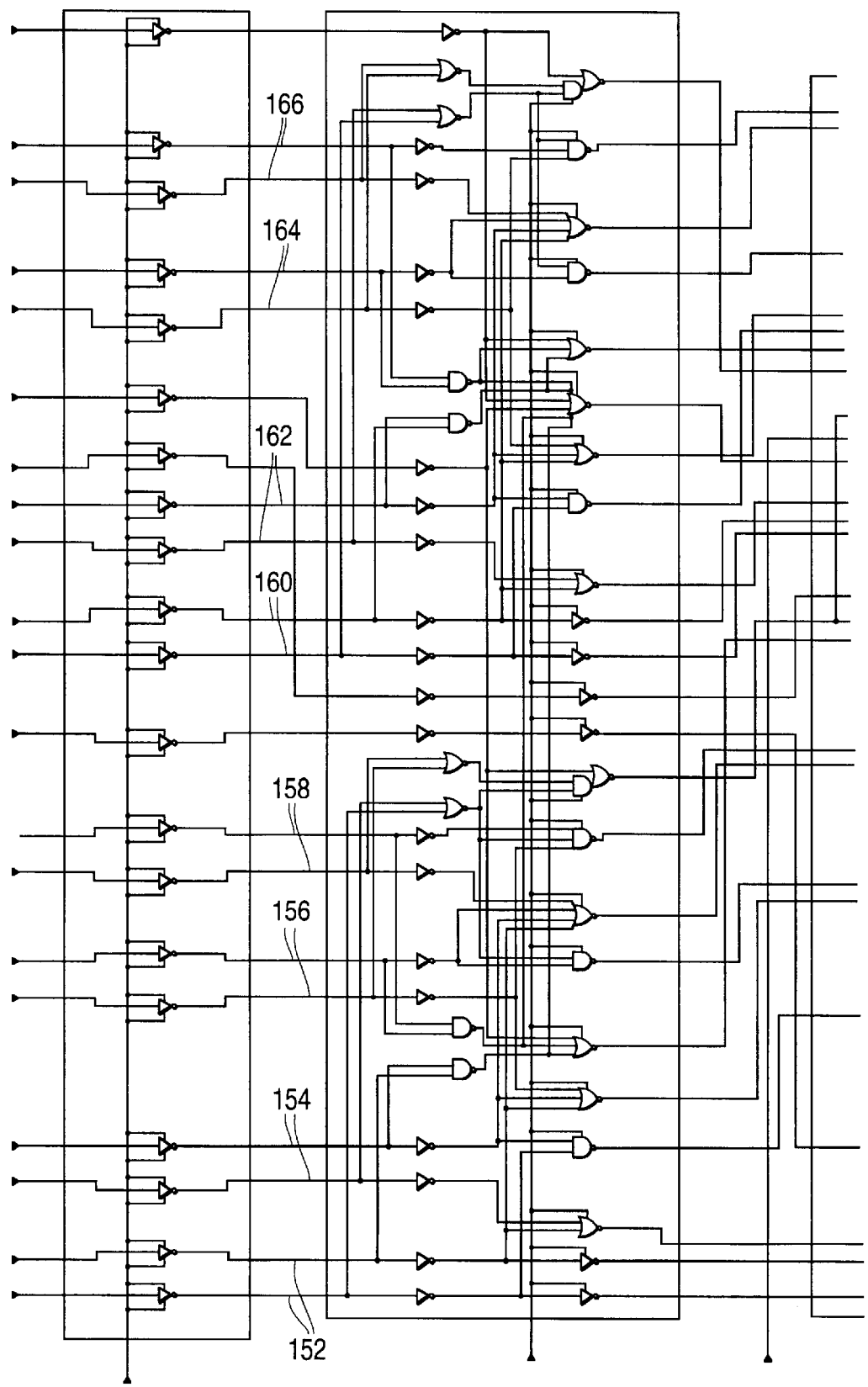
FIG. 11 is a circuit diagram of one logic block of a circular priority encoder according to an example embodiment of the present invention.
Figure 11B:
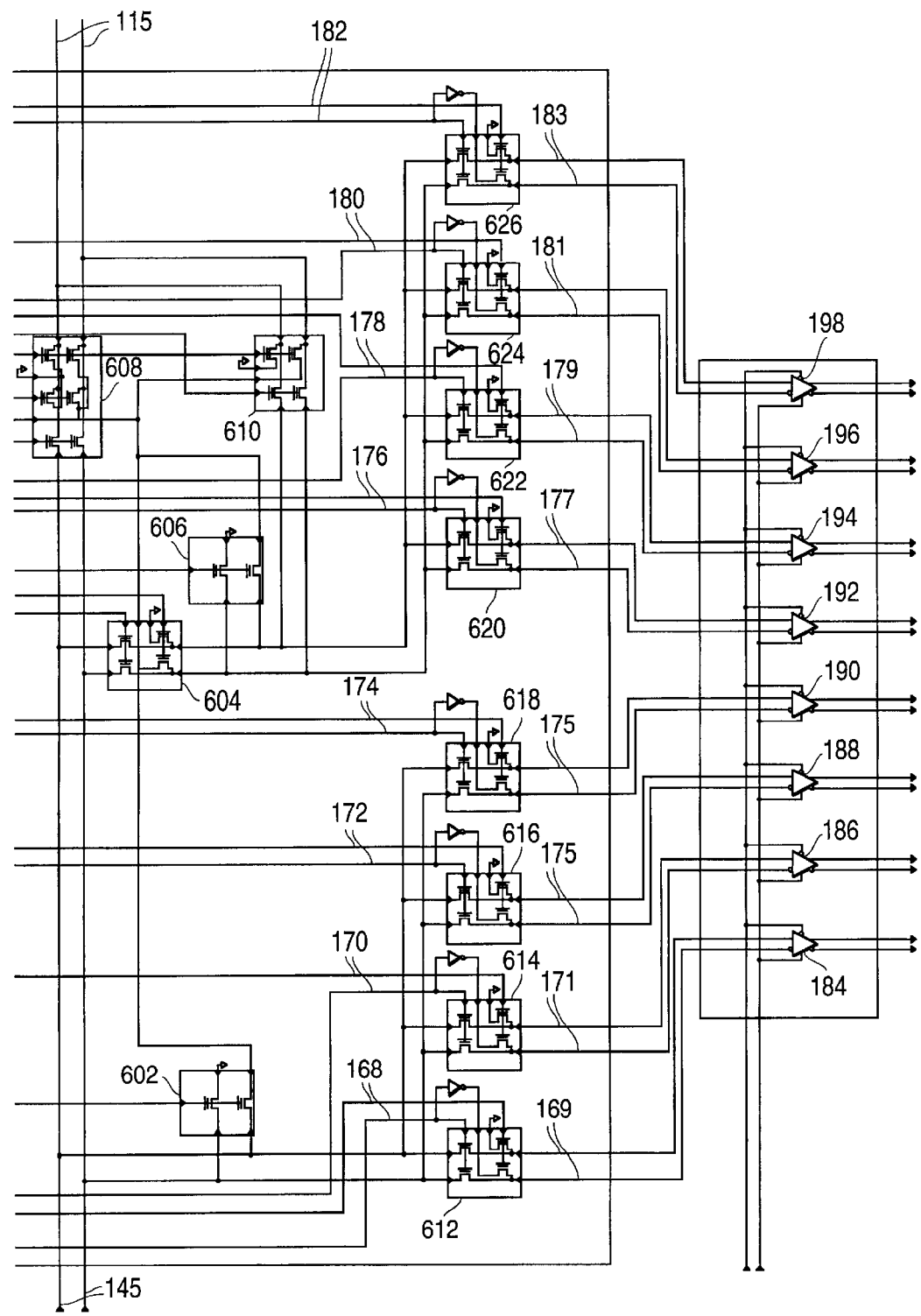
Figure 12:
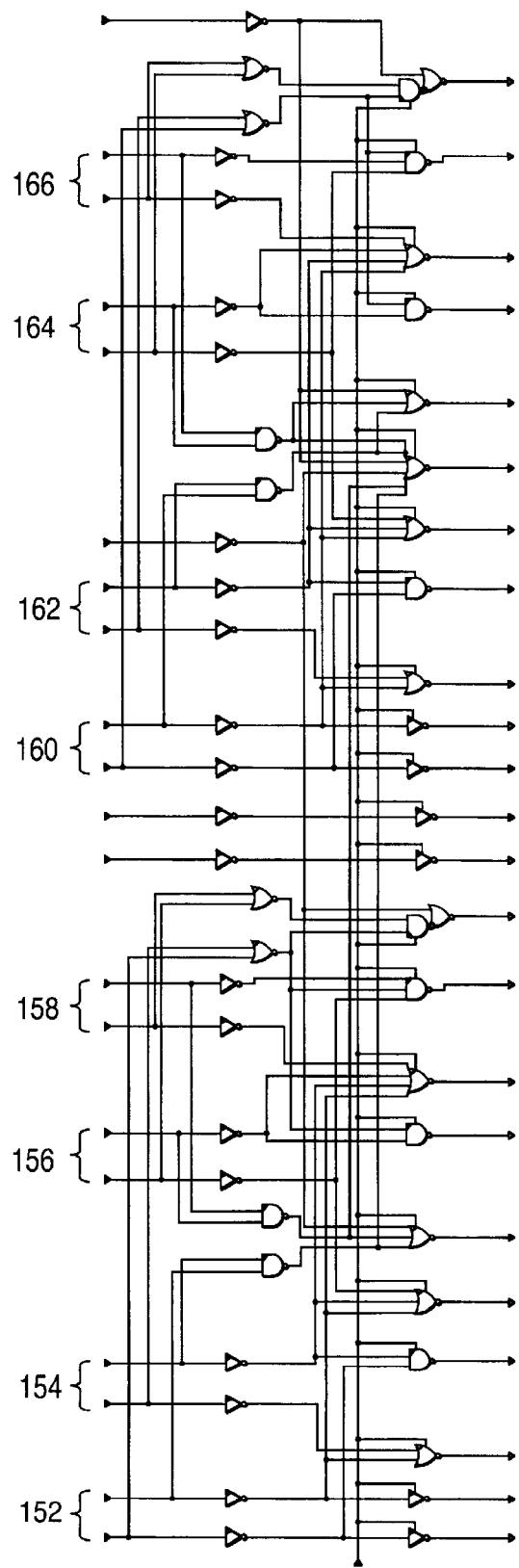
FIG. 12 is a circuit diagram of the full logic block of the circular priority encoder of FIG. 11.
Figure 13:
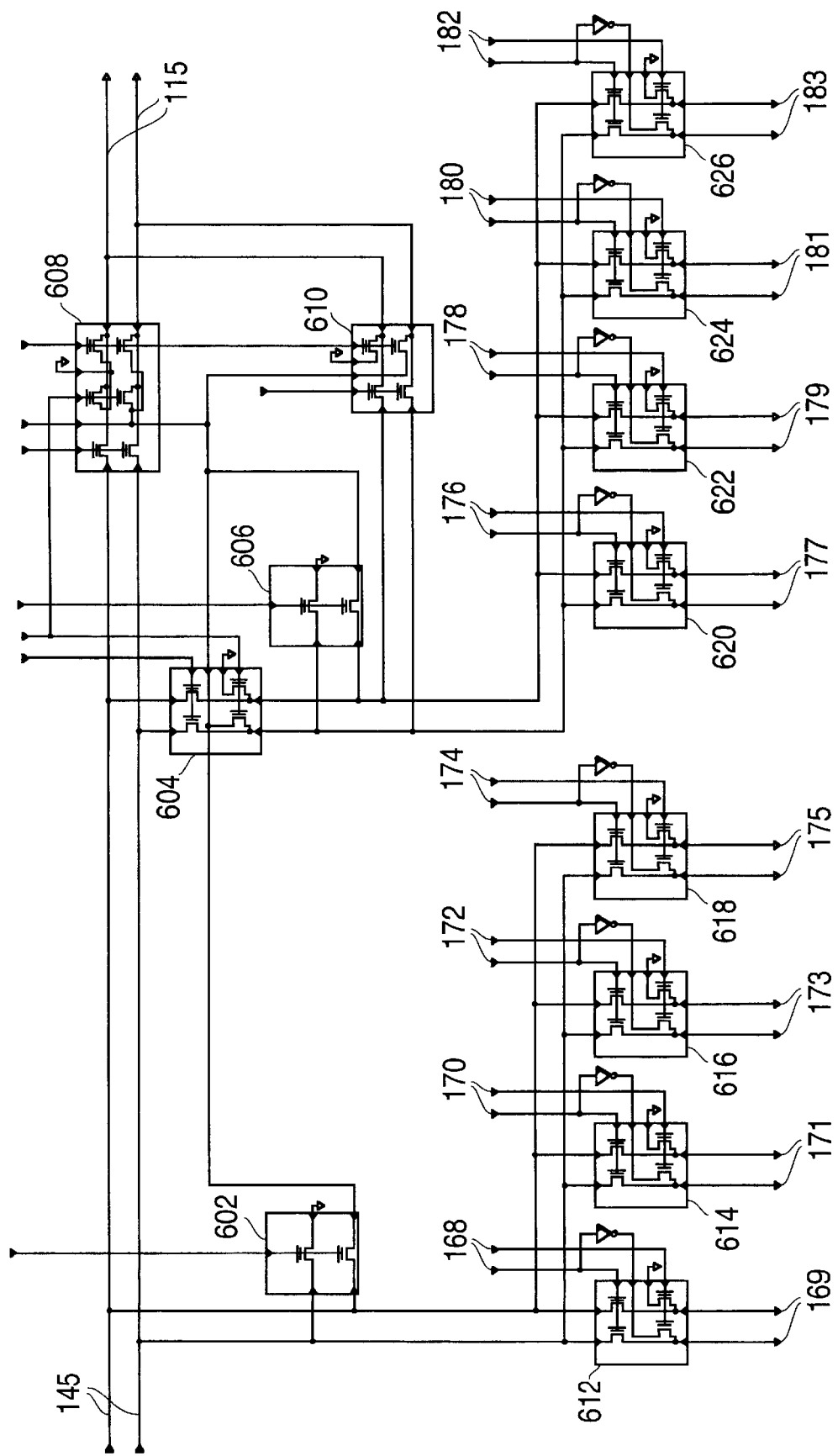
FIG. 13 is a circuit diagram of the passgate structure of the circular priority encoder of FIG. 11.

FIG. 11 is a circuit schematic diagram of one logic block (such as logic block 110) of the circular priority encoder 100 of FIG. 10. As described above, each of the other logic blocks may include similar circuits as shown in FIG. 11. The FIG. 11 embodiment will hereafter be described with respect to FIGS. 12 and 13 which show more specific portions of the FIG. 11 circuit schematic diagram. For example, FIG. 12 shows the full swing logic block of the circular priority encoder 100 shown in FIG. 10. This 8 bit block group may also correspond to the full swing logic block 12 shown in FIG. 3. For example, FIG. 12 shows a first differential signal 152, a second differential signal 154, a third differential signal 156, a fourth differential signal 158, a fifth differential signal 160, a sixth differential signal 162, a seventh differential signal 164 and an eighth differential signal 166 corresponding to 8 input bits (such as bits 0–7 that are input to logic block 110). These input signals may be applied through the logic circuits as shown in FIGS. 11 and 12 to produce signals 168, 170, 172, 174, 176, 178, 180 and 182 that are input to pass cells 612, 614, 616, 618, 620, 622, 624 and 626, respectively. The FIG. 12 circuit also produces control signals for 4 bit and 8 bit pass and kill as well as produces signals corresponding to the highest bit. As shown in FIG. 13, each of the signals 168, 170, 172, 174, 176, 178, 180 and 182 is input to one of the pass cells to produce output signals 169, 171, 173, 175, 177, 179, 181 and 183, respectively. The output signals 169, 171, 173, 175, 177, 179, 181 and 183 are shown as differential signals and may be input to sense amplifiers 184, 186, 188, 190, 192, 194, 196 and 198, respectively, as shown in FIG. 11. The clocking of the circuit may be similar to the previously described embodiment.

FIG. 13 (and FIG. 11) further shows signals 145 entering the passgate circuit from the left and shows signals 115 leaving the passgate circuit on the right. These signals correspond to signals 145 coming from the fourth logic block 140 to the first logic block 110 and signals 115 sent from the first logic block 110 to the second logic block 120 as shown in FIG. 10. As described above with respect to FIG. 10, differential signals of the ANDing from upstream logic blocks may be communicated along the signal lines 145 and 115. That is, these signal lines may be used to signify whether a HIGH state has been determined for a bit (or differential signal) in that grouping or for any upstream grouping.

In an embodiment of the circular priority encoder, the passgate chain may circulate a signal (called a carry) which may be generated by a "start" signal from a bit location, either pass it to the next bit (if no HIGH is found) or kill it (if a HIGH is found).

The passgate structures 602 and 606 shown in FIG. 13 (and FIG. 11) are passgates for a "generate" bit if a start bit location is within the 8 input bits (i.e., of the differential signals) of this logic block. The passgate structures 604 and 610 are a group of four "propagate and kill" type of passgate. Additionally, the passgate structure 608 is a group 8 "propagate and kill" type of passgate. The passgate structures 612, 614, 616, 618, 620, 622, 624 and 626 along with corresponding inverters are the pass or kill type of passgate to complete the final ANDing. That is, if a "carry" from upstream differential signals (i.e., signal 145) is a HIGH state and the HIGH state is again found in one of the input signals to this logic block, then the kill of the passgate structure (i.e., of the passgate structures 612, 614, 616, 618, 620, 622, 624, 626) will reverse the "carry" so that a zero (or LOW) will propagate through the rest of the passgate chain (i.e., to the downstream structure). As previously described, a sense amplifier may be attached to each passgate structure 612, 614, 616, 618, 620, 622, 624 and 626 to recover the small differential signal.

The full swing logic block may take an 8-bit differential input, generate two 4-bit group propagate and kill signals, one 8-bit propagate and kill signal and two group generate signals. If a HIGH is determined, then the kill will reverse the carry. The carry signal may circulate the carry signal to complete the rest of the evaluations. This makes sure that the upstream passgates are turned off when a generate is asserted downstream.

The full swing may take 8-bit group and local propagate and kill generate may be implemented in D2 domino circuits. This 8-bit block may generate full swing signals to control the NMOS passgates chain. These signals include ANDing of 2 to 8, a group kill if a HIGH is found, a generate if a start is found and block the upstream passgates if a generate is asserted.

As discussed above, multiple 8 bit groups may be coupled in a circular passgate chain to design a circular priority encoder. This topology may be scaled based on the bit width of the input vector. Further, adding one 8-bit logic block into the passgate chain may only add one passgate into the passgate chain. Thus, a 64-bit circular priority encoder may be implemented using this topology having a passgate chain of nine.

A single 50% duty cycle clock may be used for design simplicity. The clocks can be distributed in each of the 8-bit logic blocks for better skew control.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention.

What is claimed is:

1. A circular priority encoder comprising:
   input terminals to receive a plurality of signals;
   a plurality of circuit blocks to prioritize subsets of the plurality of signals, and to provide information regarding highest priority signals within the subsets having a predetermined state; and
   a circular passgate chain coupled to the plurality of circuit blocks, the circular passgate chain to receive an indication of a highest priority input terminal, and to prioritize the information provided by the plurality of circuit blocks.

2. The circular priority encoder of claim 1, wherein said input terminals are numbered 0 to N and said highest priority input terminal is terminal M, where N>M>0.

3. The circular priority encoder of claim 2, wherein the circular passgate chain is coupled to propagate a carry signal corresponding to terminal M in a decreasing order to terminal 0.

4. The circular priority encoder of claim 3, wherein the circular passgate chain is coupled to further propagate the carry signal from terminal N in a decreasing order toward terminal M+1.

5. The circular priority encoder of claim 1, wherein the plurality of circuit blocks comprises a first circuit block to receive a first subset of the plurality of signals and a second circuit block to receive a second subset of the plurality of signals.

6. The circular priority encoder of claim 5, wherein input terminals coupled to said first circuit block are numbered 0 to X and input terminals coupled to said second circuit block are numbered X+1 to N, where 0<X<X+1<N, and wherein said highest priority input terminal is numbered M, where N>M>0.

7. The circular priority encoder of claim 1, wherein each of the plurality of signals comprises a differential signal.

8. The circular priority encoder of claim 1, wherein the circular priority encoder examines the plurality of signals until determining a highest priority signal having said predetermined state.

9. The circular priority encoder of claim 1, wherein said predetermined state is a HIGH state.

10. A priority encoder to receive a plurality of signals at corresponding input terminals and to determine a highest priority signal having a predetermined state, said signals being prioritized based on their corresponding terminals, wherein said terminals are prioritized in a sequentially decreasing order from a terminal M to a terminal 0, and continuing in a sequentially decreasing order from a terminal N toward a terminal M+1, where 0<M<M+1<N, the priority encoder including a plurality of full swing logic circuits and a plurality of passgate structures coupled to form a circular passgate chain.

11. The priority encoder of claim 10, wherein the plurality of full swing logic circuits includes a first circuit to receive a first subset of the plurality of signals and a second circuit to receive a second subset of the plurality of signals, wherein said first circuit is coupled to the circular passgate chain to inform the circular passgate chain if said first circuit determines said highest priority signal having said predetermined state is one of said first subset of the plurality of signals.

12. The priority encoder of claim 11, wherein said second circuit is further coupled to the circular passgate chain to inform the circular passgate chain if said second circuit determines said highest priority signal having said predetermined state is one of said second subset of the plurality of signals.

13. The priority encoder of claim 10, wherein the plurality of full swing logic circuits comprises a first full swing circuit and the plurality of passgate structures comprises a first passgate structure, said first full swing circuit to receive a first subset of the plurality of signals and determine if any of the first subset of the plurality of signals has said predetermined state.

14. The priority encoder of claim 13, wherein the plurality of passgate structures further comprises a second passgate structure, and wherein said first passgate structure is coupled to the second passgate structure to communicate information regarding said highest priority signal having said predetermined state.

15. The priority encoder of claim 14, wherein the plurality of full swing logic circuits further comprises a second full swing circuit to receive a second subset of the plurality of signals and to determine if any of said second subset of the plurality of signals has said predetermined state.

16. The priority encoder of claim 15, wherein said second passgate structure is coupled to said first passgate structure to communicate information to said first passgate structure regarding said highest priority signal having said predetermined state.

17. The priority encoder of claim 16, wherein each of said plurality of signals comprises a differential signal.

18. A priority encoder comprising:
a first circuit having a first full swing portion to receive a first plurality of signals and determine if any of said first plurality of signals have a predetermined state, and a first passgate portion coupled to said first full swing portion;
a second circuit having a second full swing portion to receive a second plurality of signals and determine if any of said second plurality of signals have said predetermined state, and a second passgate portion coupled to said second full swing portion; and
a third circuit having a third full swing portion to receive a third plurality of signals and determine if any of said third plurality of signals have said predetermined state, and a third passgate portion coupled to said third full swing portion, wherein said first passgate portion, said second passgate portion and said third passgate portion are coupled in a circular manner to communicate information regarding a highest priority signal having said predetermined state.

19. The priority encoder of claim 18, further comprising a fourth circuit having a fourth full swing portion to receive a fourth plurality of signals, and a fourth passgate portion coupled to said fourth full swing portion, wherein said fourth passgate portion is coupled in said circular manner to said first passgate portion, said second passgate portion and said third passgate portion to communicate information regarding said highest priority signal having said predetermined state.

20. The priority encoder of claim 18, wherein said first passgate portion receives information from said first full swing portion regarding whether any of said first plurality of signals have said predetermined state.

21. The priority encoder of claim 20, wherein said first passgate portion communicates said information to said second passgate portion and said third passgate portion.

22. The priority encoder of claim 18, wherein each of said signals comprises a differential signal.

23. The priority encoder of claim 18, wherein said predetermined state is a HIGH state.

24. A method of determining a highest priority signal having a predetermined state, said method comprising:
receiving a first plurality of signals at terminals of a first circuit block;
receiving a second plurality of signals at terminals of a second circuit block;
receiving a third plurality of signals at terminals of a third circuit block, wherein said first circuit block, said second circuit block and said third circuit block are coupled to passgate structures sequentially coupled in a circular manner to communicate with each other; and
determining a highest priority signal having said predetermined state by examining said signals starting with said circuit block having a highest priority terminal and proceeding in said circular manner to examine signals at lower priority terminals.

25. The method of claim 24, wherein said highest priority terminal is provided in said second circuit block and said method determines said highest priority signal having said predetermined state by examining said signals starting with said highest priority terminal and proceeding in said circular manner to examine signals at lower priority terminals in said second terminal, said third terminal and said first terminal.

26. The method of claim 24, further comprising notifying downstream circuit blocks when said highest priority signal having said predetermined state has been determined.

27. The method of claim 24, further comprising outputting signals from said first circuit block, said second circuit block and said third circuit block indicating a location of said highest priority signal having said predetermined state.

* * * * *